Nov. 26, 1940.　　　O. F. MACLAREN　　　2,222,850
AIRCRAFT UNDERCARRIAGE
Filed Oct. 17, 1938　　　4 Sheets-Sheet 1
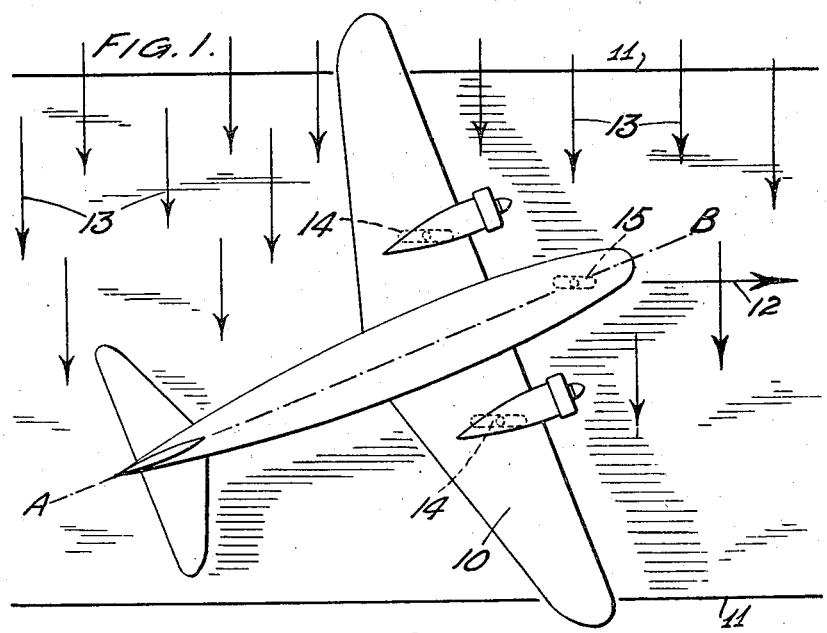
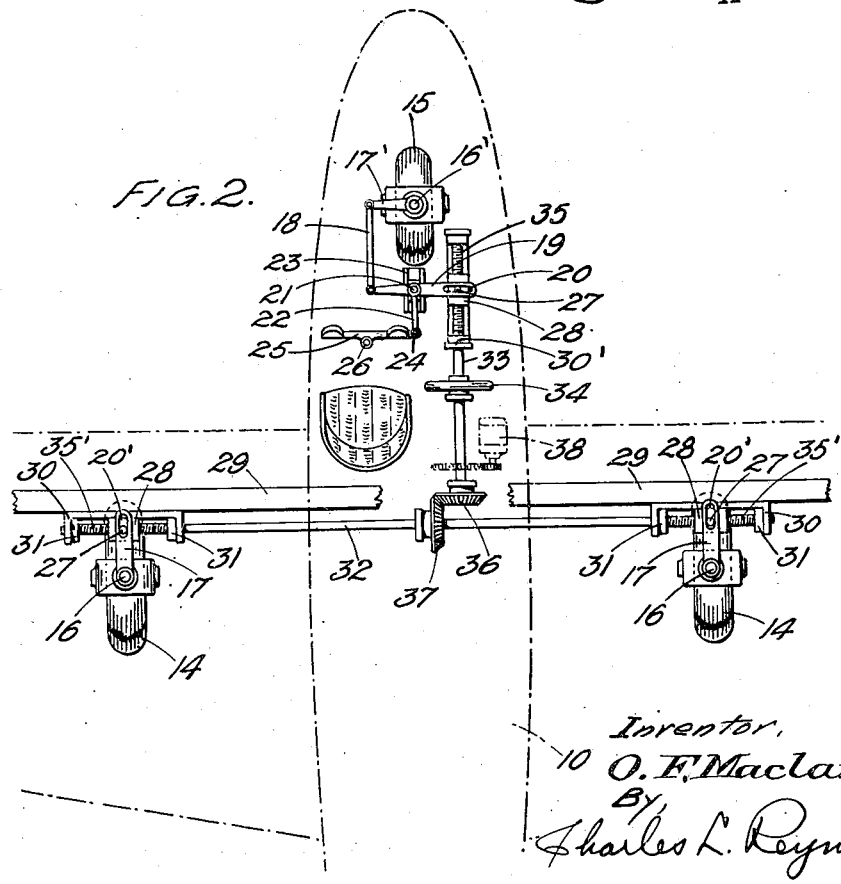
Inventor,
O. F. Maclaren,
By
Charles L. Reynolds
Atty.

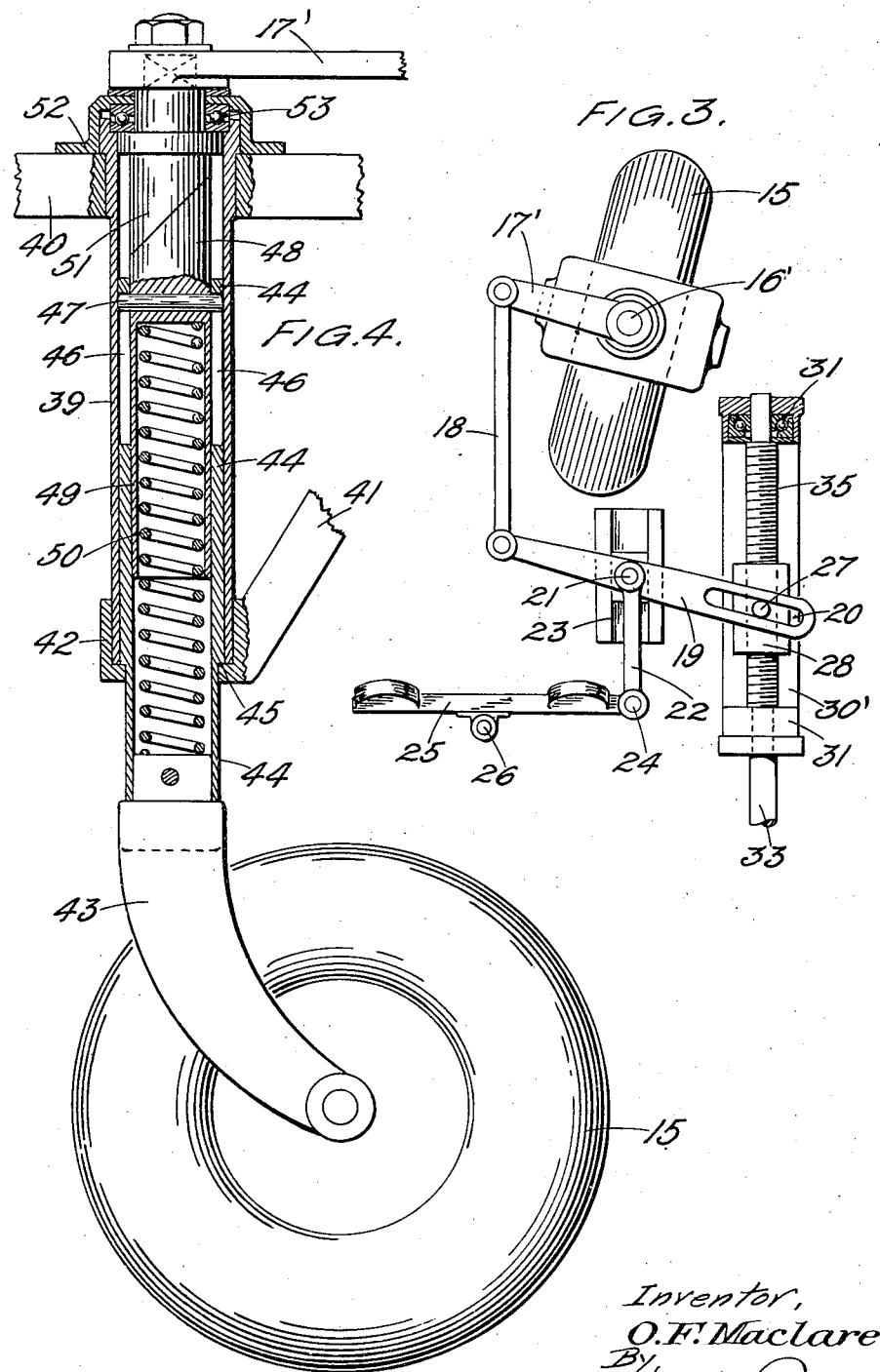

Nov. 26, 1940.  O. F. MACLAREN  2,222,850
AIRCRAFT UNDERCARRIAGE
Filed Oct. 17, 1938  4 Sheets-Sheet 3
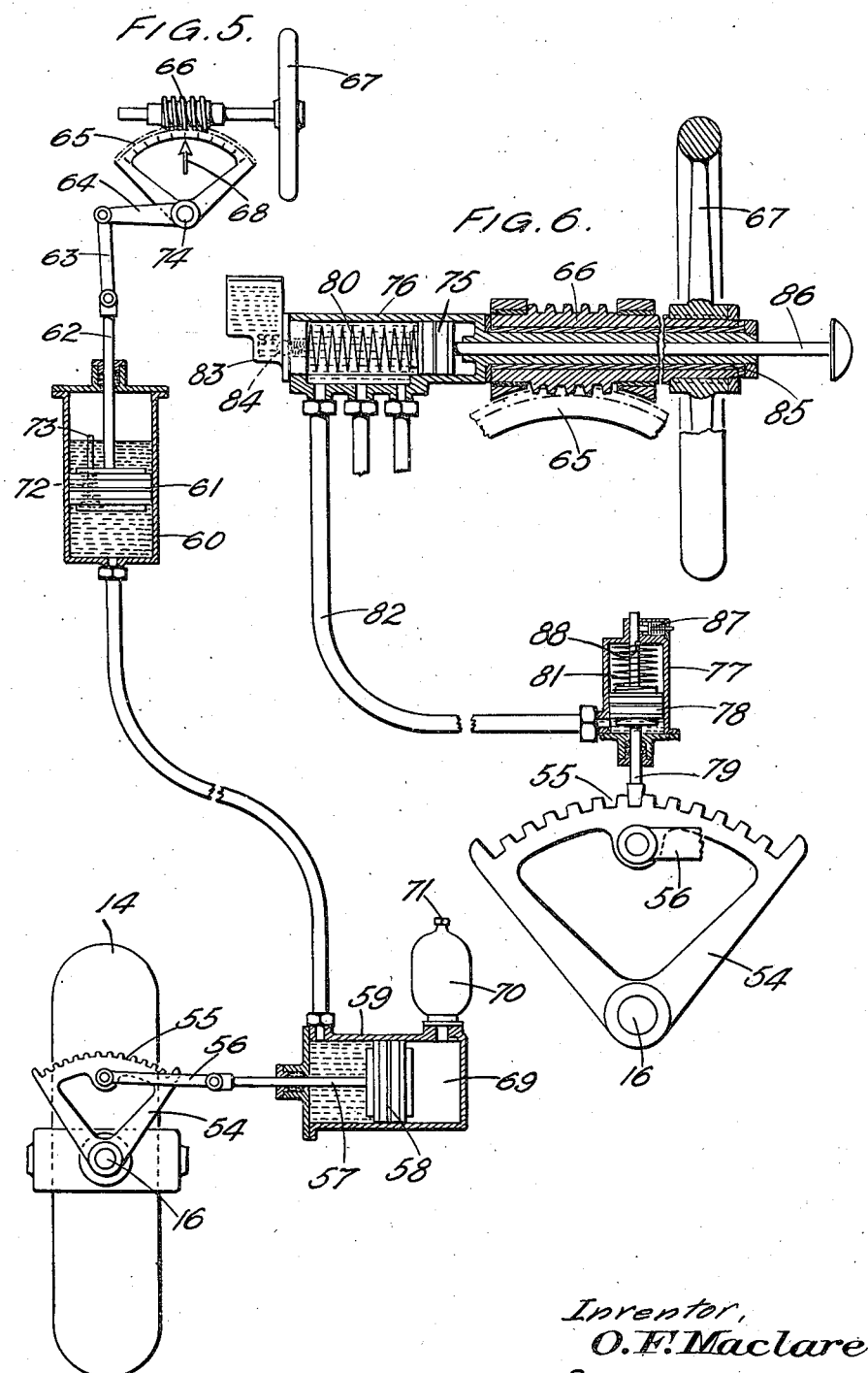
Inventor,
O. F. Maclaren,
By,
Charles L. Reynolds
Atty.

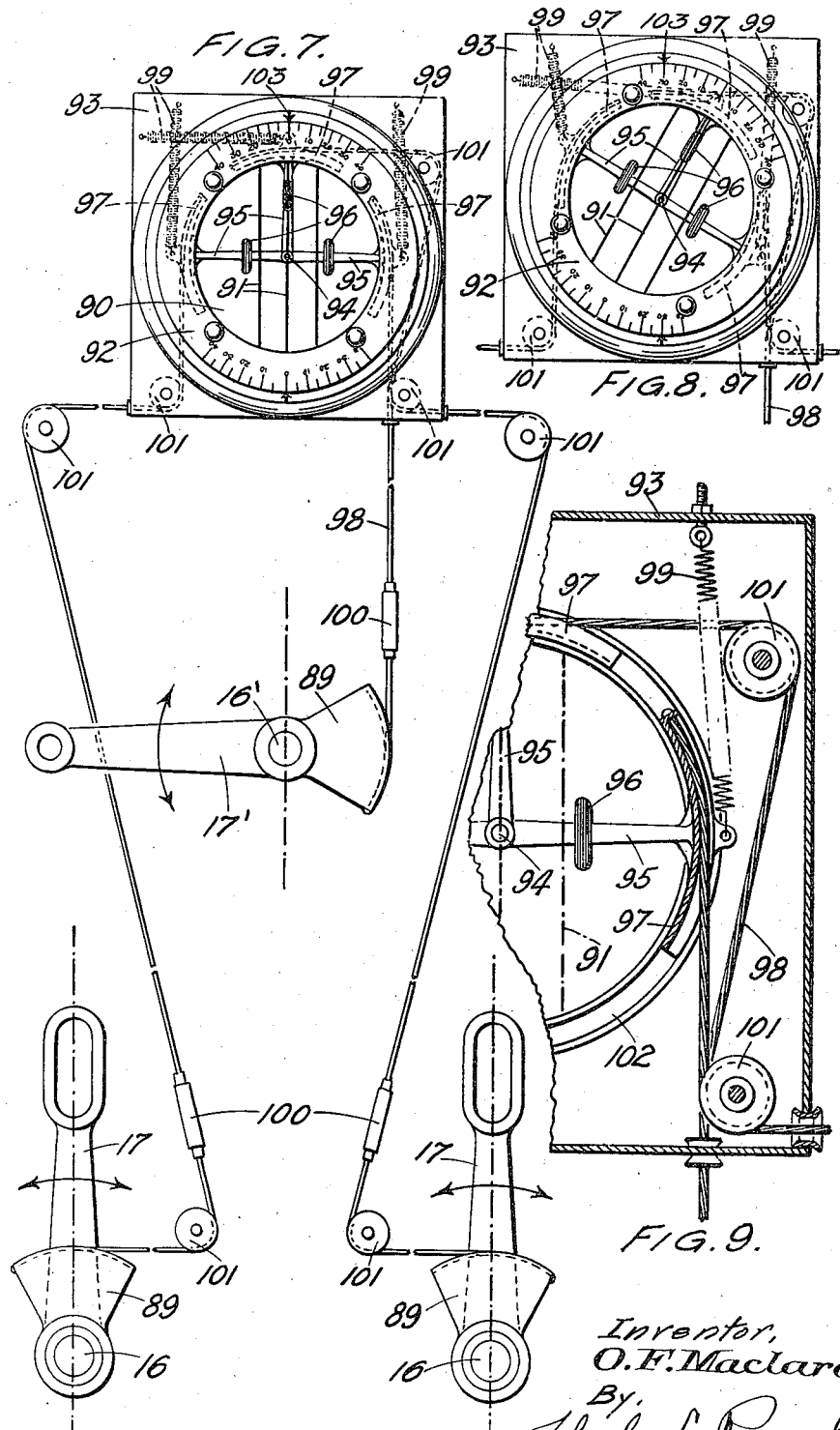

Patented Nov. 26, 1940

2,222,850

UNITED STATES PATENT OFFICE 2,222,850

AIRCRAFT UNDERCARRIAGE

Owen Finlay Maclaren, near West Drayton, England

Application October 17, 1938, Serial No. 235,419
In Great Britain October 22, 1937

22 Claims. (Cl. 244—100)

This invention relates to aircraft undercarriages. Of recent years, in consequence of increased size, take-off and landing speeds of aircraft, it has been found necessary to increase runway lengths, and since an aerodrome must afford the necessary runway length in all directions, in order that the airplane may land into or with the wind, which may come from any direction, considerable aerodrome area has been necessary in order to allow aircraft to take off and land safely in any possible existing wind condition. Further in order to obtain efficient take-off, it is preferable to use an aerodrome surface which is level, and as large flat areas are often unobtainable where required considerable expense may result from levelling, draining and otherwise preparing the surface for use, or a spot must be chosen that may be less desirable in all respects except that it possesses a large flat area.

The object of the present invention is to provide means whereby aircraft can both take off from and land upon aerodromes in directions other than against or with the wind, and therefore can make use of aerodromes, in the nature of strips extending in a single direction only, of smaller area than would otherwise be necessary, without involving undue side loads or the exercise of special skill. Thereby are multiplied the possible locations of such strip aerodromes, and is divdied the cost of any given aerodrome.

The invention consists broadly in an aircraft having landing gear comprising main and subsidiary landing elements—wheels, skis, floats, etc.—as defined below, in which the main landing elements are laterally spaced elements capable of being directionally set together in parallel tracks in various running directions by means controllable by an occupant of the aircraft, and held in such setting so as to enable cross-wind alighting or take-off to be done, the said subsidiary element being capable of directional movement such that the aircraft can be steered when ground-borne without accompanying change of setting of the main elements. If the occupant of the aircraft wishes to land his aircraft in a desired direction other than against or with the wind, he steers his aircraft so that upon contact with the aerodrome it is travelling in that direction. He then causes the main landing elements to be set and held in that same direction, so that the aircraft can make contact with the ground without any substantial side loads being subjected to the said landing elements and to the undercarriage.

As the speed of the aircraft diminishes side loads will occur and the aircraft will tend to be deflected from its course and slewed round. According to the invention a subsidiary landing element is one so provided as to enable the aircraft to be steered when "ground borne" i. e. when the aircraft is in contact with the ground. In order to effect steering according to this invention the subsidiary element must be capable of directional movement when the aircraft is ground borne. It is preferable that the occupant should be able to steer the aircraft by varying the direction of the subsidiary landing element, but with a twin engine aircraft, if the subsidiary landing element is permitted to castor freely or preferably subject to a yielding restraint the aircraft can be steered by varying the relative speeds of the engines.

When the subsidiary landing element first touches the ground upon landing it is desirable that it should be parallel to the main landing elements. There is therefore preferably provided means to enable the occupant to adjust the subsidiary landing element into a setting in parallelism with the main landing elements, and it is desirable that the mechanism which sets the main landing elements should also cause the subsidiary landing element to be adjusted in parallelism therewith. Further, the means for setting the main landing elements are preferably irreversible, i. e. are such that landing loads tending to upset the setting and to change the alignment of the main landing elements, are transmitted to and resisted by the aircraft structure and are not transmitted back to the operator. Such mechanism may for instance be irreversible mechanical gearing or hydraulic transmitter means and mechanical locking means. Theoretically if the setting of the landing elements be perfect for the given conditions there will be no side leads upon them when the aircraft first comes into contact with the ground. In practice it is, however, necessary to make provision for side loads, since otherwise an imperfect setting due perhaps to some misjudgment of the pilot might cause a serious accident. It is therefore very desirable that no landing loads should be transmitted back to the operator, but should be taken by those points or regions in the aircraft structure, preferably adjacent each landing element, which are selected and designed to be suitable to most such loads.

For the purpose of steering the subsidiary landing element is preferably controllable by differential means so that it is movable directionally by the same control as that which sets the main elements, and alternatively, in the neutral or in any directionally set position, by the steering means used in flight which would normally be the rudder-bar. The setting means preferably acts on this subsidiary element irreversibly so far as directional setting of this element is concerned.

The invention is especially, though not exclusively, applicable to an aircraft having a tricycle landing gear, i. e. a landing gear in which laterally spaced main landing elements are situated behind the centre of gravity and a nose landing element is situated ahead of that centre, this invention enabling such an undercarriage to be used with greater safety than previously in cross-wind conditions.

By the expression "main landing elements" is meant those elements (or element) which are adapted to take the whole or substantially the whole of the landing load if necessary.

By the expression "subsidiary landing element" is meant the element (or elements) provided nearer to the tail or nose of the aircraft than the main landing elements so as to stabilise the aircraft in the fore and aft vertical plane when not air-borne. In a tricycle landing gear the nose landing element is the subsidiary landing element.

By the expression "landing element" is included any wheels, tracks, skis or the like of such a kind as to tend to run in the direction in which they are aligned by setting, adjustment or directional movement. The term "wheel" will ordinarily be used hereafter, to typify the landing elements, and that term will be understood, in the specification and in the claims, to include each other form, unless clearly used in a restrictive sense.

The mechanism for controllably directing the wheels may take any convenient form, for example a mechanical, fluid-pressure or power-operated system may be used, and preferably means are provided for ensuring that the wheels, in the act of directionally setting them, are angularly moved by equal amounts so as to maintain substantial parallelism, bearing in mind of course the possibility of providing an over-riding ground-steering control for one or more wheels as indicated above. In a mechanical system of operation directional setting may be effected by screw and nut or worm mechanism, whilst in a fluid-pressure arrangement a single-acting resiliently returned remote control system may be used, a separate transmitter and receiver being used for each wheel.

An important subsidiary feature of the invention resides in the provision of means for positively and preferably locally locking certain wheels in the required angular setting, and this may be effected by the inherent nature of the operating mechanism, for example through the non-reversibility of screw and nut mechanism adjacent each wheel, or by means of an independent lock adjacent each wheel, suitably operable by the pilot or other person.

Suitable means may be used for indicating to the pilot the angular setting of the wheels and such indication may be used in conjunction with a drift indicator of known kind so that the pilot may readily set his wheels for landing position by a direct observation of the ground through the drift indicator.

Further detailed and subsidiary features of the invention will become more clearly apparent in the following description of preferred embodiments of the invention.

The invention is diagrammatically illustrated in the accompanying drawings, which indicate the underlying principle and certain operating and locking mechanisms for controlling angular movements of the undercarriage gear. In the drawings:

Figure 1 shows diagrammatically the conditions arising during the landing and take-off of an aircraft across wind;

Figure 2 indicates diagrammatically a mechanical mechanism for angularly directing the main and nose wheels of an aircraft;

Figure 3 is an enlarged view indicating the over-riding control for allowing steering of the aircraft;

Figure 4 is a sectional view of a shock-absorbing undercarriage leg suitable for use as a nose or tail wheel allowing castoring whilst incorporating self-aligning means, with over-riding mechanism for turning the wheel both for directionally adjusting it and for directionally moving it for steering;

Figure 5 shows diagrammatically a hydraulic remote control system as applied to one wheel for effecting directional setting, it being appreciated that similar mechanism is normally provided for each wheel to be so set;

Figure 6 shows in section locking mechanism for locking a wheel in fixed direction;

Figure 7 shows a drift indicator incorporating means for indicating the angular positions of the wheels and showing diagrammatically a cable connection with the latter;

Figure 8 is a view of the drift indicator and undercarriage indicators moved to a position suitable for landing with drift; and Figure 9 is an enlargement of one undercarriage indicator arm.

In Figure 1 the aircraft is indicated at 10, and a strip aerodrome is diagrammatically shown as being bounded by the lines 11 parallel to the direction of landing or take-off indicated by the arrow 12. The direction of wind which for the purposes of this illustration is considered to be at right angles to the aerodrome, is shown by arrows 13, and a simple vector triangle calculation compounding the wind speed and direction with the air speed of the aircraft also in the appropriate direction results in obtaining an angle of drift, which is the angle at which the wheels should be set relative to the longitudinal axis of the aircraft so that in landing substantially great side loads on the undercarriage may be avoided. For take-off similar calculations may be made taking into account the thrust forces developed during such conditions. It will be observed in Figure 1 that the direction of travel of the aircraft is displaced from its longitudinal axis A—B and the three wheels, being the main landing wheels 14 and the subsidiary or nose wheel 15, are in substantial parallelism. This "crabbing" movement of the aircraft is linear in the direction of 12.

In Figures 2 and 3 a tricycle undercarriage is indicated, having main wheels 14 mounted about substantially vertical axes 16. The wheels are conveniently carried on suitable cantilever shock-absorbing struts of telescopic nature having provision for transmitting torque between the telescoping parts, for example in the form of the known toggle links, whilst the upper end of the shock-absorber is rotatably mounted in spaced journal bearings in the aircraft with suitable thrust bearings for taking landing vertical loads, and has at its upper end an operating lever 17 secured so that angular movement thereof results in angularly turning and thus directionally setting the wheel 14. The nose wheel 15 is similarly mounted about axis 16' for rotation through lever 17', which is connected by a pivoted link 18 to a lever 19. The lever 19 is slotted at 20 and corresponding slots 20' are provided in levers 17, whilst the lever 19 between its ends is pivoted at 21 to a link 22, the pivot being guided for fore-and-aft movement in a slide 23. The link 22 is pivoted at 24 to a rudder bar 25 adapted to be foot-operated by the pilot, and normally also controlling the air rudder. It will be appreciated that angular movement of the rubber bar 25 about its pivot 26 will cause corresponding, though not necessarily equal, angular turning of the wheel-carrying shock absorber about its axis 16', whereby an over-riding steering effect can be obtained in additional setting to the angular direction in parallelism with the wheels 14 described below. The slots 20' in the levers 17, and the slot 20 in the lever 19, are engaged by pins 27 carried on nut mechanism 28, which is restrained against rotation by suitable means, for example by being engaged in a slide 29 as seen in relation to the wheels 14, the slide being fixed in the aircraft and also serving to support brackets 30. A similar bracket 30' is provided for the forward wheel 15, and combined thrust and journal bearings 31 support shafts 32 and 33. The nature of the bearings may be seen more clearly in Figure 3 and the shaft 33 extending from the bracket 30' carries a hand wheel 34 by which it may be rotated to cause relative rotation of the nut and engaging screwed part 35 of the shaft 33. Similar screwed parts 35' are provided at the extremities of the shaft 32 which extends between the wheels 14 of the aircraft 10, and the rotation of the hand wheel 34 is transmitted through co-operating bevel wheels 36 and 37. The threads 35' at the opposite ends of the shaft 32 are of similar hand, whilst to accommodate for the reversal of direction of rotation of the shafts 32 and 33 through the bevel wheels the thread 35 on the shaft 33 is of opposite hand. Thus for example, the shaft 32 may have left hand threads and the shaft 33 a right hand thread. The lengths of the levers 17 between the axis 16 and the pins 27 are themselves equal, and also equal to the lever between the pivot 21 and pin 27 engaging the slot in the lever 19, so that the gear ratio between the bevels 36 and 37 being 1—1, and the relationship of arm 17', link 18 and lever 19 being appropriate, the wheels are maintained in substantial parallellism when angularly turned by rotation of the hand wheel 34. It will be appreciated that a parallel linkage mechanism connects the rotation of the lever 19 about pivot 21 and that of the shock absorber of the nose wheel about the axis 16'. If a power mechanism is required for rotating the wheels, conveniently an electric motor may be used such as is indicated at 38.

So far as the directional setting mechanism of the main wheels is concerned the screw action is irreversible and thus localises landing loads which may tend to change the alignment of the main wheels; the screw 35' is also irreversible, but a proportion of loads on the wheel 15 may be transmitted through link 22 to the rudder-bar 25 and have to be resisted by the pilot.

It will be noted that in Figures 1, 2 and 3, the nose wheel is for simplicity drawn in a relationship to the axis 16, which does not afford any or any marked self-tracking or castoring property; whilst this is a possible arrangement it is not the preferred one, for it is at present deemed desirable in practice to afford restrained castoring, i. e. to provide castoring under the restraining influence of yielding means, e. g. a spring, whilst also allowing it to be directionally adjusted together with the main wheels. In Figure 4 a shock absorber mounting is diagrammatically shown incorporating means for allowing restrained castoring, with a self-aligning mechanism incorporated, and this comprises relatively telescoping parts, the outer one 39 of which is secured non-rotatably in the aircraft structure indicated at 40. A bracing strut 41 is attached to the lower end of the telescoping tube 39 through a collar 42 and at its upper end is secured to the aircraft structure in any convenient manner. The wheel 15 is carried in a somewhat trailed fork fitting 43 at the lower end of an inner telescoping tube 44 which is restrained against parting from the outer tube 39 in the telescopic sense by abutments diagrammatically indicated at 45. The tube 44 terminates some distance below the upper extremity of 39 so as to allow full telescoping movement for shock absorption, and at its upper end has a pair of longitudinal diametrically opposed slots 46 which are engaged by a transverse pin 47 carried diametrically of a cam part 48, which has a downwardly extending cylindrical part 49 forming a hollow stem slidably fitting within the inner tube 44. A helical compression spring 50 is accommodated within the tubes 49 and 44 and urges the shock absorber to extend in the telescopic sense, and represents any suitable cushioning means. The cam part 48 co-operates with a complementarily formed part 51 against a cap 52 attached at the upper end thereof through the medium of a thrust race 53. In the position shown in the figure the shock absorber is fully extended and the cams are resiliently urged together by the spring 50. On compression of the shock absorber the transverse pin 47 in the slots 46 allows relative sliding of the tubes 39 and 44 and compression of the spring 50 occurs, which compression additionally urges the cams 48 and 51 into engagement. The cooperation of the cams gives rise to a restoring torque should the wheel 15 castor entail rotation of the tube 44 relative to the tube 39. Such rotation is transmitted to the cam 48 by the pin 47, and cam 51 may be considered as fixed, although it is rotatable as indicated above through a lever arm 17' for the purpose of directional adjustment and directional movement for steering, in the manner indicated in Figure 2. The lever 17' in Figure 4 has, for clarity, been shown projecting at right angles to its position in other figures. Angular swinging of the lever 17' causes rotation of the cam 51, which rotation is transmitted to the cam 48 and thence to the fork fitting 43 carrying the wheel 15. An alternative method of providing restrained castoring is readily provided in a construction as shown in Figure 3, by forming the link 18 telescopically yieldable against resilient restraint and by using a trailed wheel mounting. It is immaterial where, in the connections between 21 and 44, the ability to yield is incorporated, and any two-way resilient, self-restoring arangement may be employed, or none at all if preferred. The construction would be such as to allow both extension and contraction.

Where, instead of the mechanical means described, hydraulic remote control means are used for angularly directing the wheels, it is convenient to provide three sets of transmitter and receiver single-acting piston and cylinder devices and in Figure 5 one such remote control system is illustrated. In this figure the wheel 14 is again capable of being angularly directed by rotation about axis 16 of the shock absorber and in place of the lever 17 a quadrant 54 is secured to the upper end of the shock-absorber, there being provided tooth formations 55 for the purpose of locking the wheel in set directions as indicated below, and as illustrated in Figure 6.

The quadrant 54 is connected by means of a pivoted link 56 to a piston rod 57 carrying a piston 58 of a receiver or slave unit, the cylinder of which is indicated at 59. The transmitter comprises a cylinder 60, piston 61 and piston rod 62 connected by a pivoted link 63 to the lever arm 64 on a worm quadrant 65 engaged by a worm 66 on a manually rotatable wheel 67. The quadrant 65 may carry suitable calibrations to be read against a relatively fixed arrow 68 whereby an indication of the angular position of the wheel may be given. In order to assist the return movement of the piston 58 a chamber 69 is in connection with a compressed air bottle 70 inflatable through a valve 71 so that the piston is resiliently urged to the left and to a position where it abuts against the end of the cylinder, when the wheel is known to be in a predetermined angular position or setting. The piston 61 in the transmitter includes a spring-loaded valve 72 on a stem 73 which is adapted to abut against the cylinder end 60 when the piston 61 is in an upward extreme position. The two cylinders 61 and 59 are interconnected by a single pipe line filled with liquid, and the space above the piston 61 forms a reservoir for topping up or receiving excess fluid so as to maintain synchronism between the pistons 61 and 58. In order to synchronise the system and thus determine that the wheel 14 correctly follows the movement of the quadrant 65 the piston 61 is from time to time screwed up to its extreme position, when the valve 72 will be opened by abutment of the rod 73, and the force applied by the compressed air in the chamber 69 forces the piston 58 to its extreme position, thereby ensuring that the wheel is likewise at its extreme position. It will be appreciated that each transmitter corresponding to the respective wheels is intended to be operated by a common hand wheel 67 and quadrant 65, from operating levers corresponding to 64, all being connected to a shaft rotating about the axis 74, and thus if it be desired to reset the wheels in parallelism directionally should for any reason such as fluid loss or temperature change result in slight misalignments, the operation indicated above in relation to one system is simultaneously effected in all.

Locking means suitable for use in conjunction with such an arrangement is shown in Figure 6 and this comprises a separate hydraulic pressure transmitter with piston 75 and cylinder 76 common to three slave cylinders, one of which is shown in the figure, comprising a cylinder 77 and piston 78 carrying a locking plunger 79. The pistons 75 and 78 are returned by springs 80 and 81 and a single pipe line 82 connects the transmitter with the slave. A topping-up reservoir 83 with non-return valve 84 is used to make up for any loss of fluid in the system. The cylinder 76 is provided with a cylindrical extension 85 in the bore of which slides a lock-operating plunger 86 forming the piston rod of the piston 75. The cylindrical extension 85 forms a bearing for a worm wheel 66 and associated hand wheel 67 which gears with the quadrant 65. The operation of the lock is as follows: when the rod 86 is pushed inwards, pressure is created within the cylinder 76, which is transmitted to the slave cylinder 77 to withdraw the locking pin 79 from the tooth formation 55 on the quadrant 54, thus freeing the latter to rotate about the axis 16. In order that the lock may be retained disengaged during adjustment of the wheels by the handle 67 a spring-urged detent 87 engages in a recess 88 on the piston rod of the piston 78. The spring 81 is stronger than both the spring 80 and the spring of valve 84, whilst the spring of valve 84 will yield before the spring 80 yields in the event a negative pressure occurs within the hydraulic system. The detent 87 has just sufficient effect, to hold the locking pin 79 withdrawn from the teeth 55, that the detent will hold in opposition to any tendency of the springs 80 and 81 to return the pistons to their initial position, illustrated. When it is desired to release the detent 87 and to permit reengagement of the locking pin 79 with the teeth 55 (quadrant 54 having been set in a new position of adjustment which is to be maintained), the rod 86 is pulled outwardly, or to the right, thereby in effect supplementing the combined strength of the springs 80 and 81 by a small increment, and overcoming the holding effect of the detent. The pistons 75 and 78 return to their initial positions under the influence of their respective springs, and a slight positive pressure is maintained in the hydraulic system during such return movement, preventing opening of valve 84, by reason of the preponderant strength of spring 81. The small increment by which the force of the springs 80 and 81 is augmented, in effecting release of the detent 87, is too slight to open the valve 54 in opposition to its spring. Whilst the pull on rod 86 might be considered effective to produce a negative pressure in the hydraulic system, which would tend to open the valve 84, actually the springs 80 and 81 acting in opposition to the detent are so nearly equal to the force of the detent that the additional releasing force is but slight, and immediately upon release positive pressure is restored in the hydraulic system, as pointed out above, due to the preponderantly strong spring 81.

Referring now to Figures 7, 8 and 9, which diagrammatically show indicating mechanism for the wheels, the levers 17 or 17' attached to the shock-absorbing legs carry quarter pulleys 89 radiused about axes 16 or 16' at a convenient distance. The indicating instrument itself is preferably provided in conjunction with a known form of drift indicator comprising a circular glass 90 with cross wires 91 supported in a verge ring 92 which is readily rotatable in a support 93 fixed in the bottom of the fuselage so that the ground may be viewed through the glass 90 by the pilot. Below the glass 90 are pivotally mounted on a central axis 94 three indicating arms 95 which carry markings 96 simulating the wheels of which they are required to give an indication as to angular position. The arms 95 carry at their outer extremities quarter pulleys 97 each of which is interconnected to the corresponding pulleys 89 of the appropriate wheel through a tension wire 98. The wires 98 are secured at their extremities to the pulleys 89 and 97 respectively and tension springs 99 maintain the tension in the wire cables. In order to allow initial adjustment of the indicators and wheels turnbuckles 100 are provided for varying the length of the cables. The cables where required are guided by pulleys 101. In Figure 9 a detail view is shown of one indicating arm 95 and the associated mechanism and in this figure the verge ring 92 and indicating glass 90 are removed to show a circular slide 102 in which the quarter pulleys 97 are slidably guided. In using such an indicator the pilot can, having adjusted his speed to approximately that of landing, set the cross wires 91 in the direction of travel over the ground by rotation of the verge ring 92, and such adjustment enables him to read off the angle of drift through the calibration on the verge ring read against an arrow 103 on the support. He can then turn the landing wheels by operation of the appropriate control in order to align the simulation indicators 96 with the cross wires 91, when the conditions for "crabbing" in the direction of travel over the ground are provided for.

It will be appreciated that although in Figure 2 shafts of rigid form have been illustrated it may be found convenient where a mechanical operation is desirable to transmit the power from a manually or power-operated prime mover to the wheels through flexible transmitting means, transmitting linear sliding movement or torsion. For example in an arrangement in which torsion is transmitted through a Bowden or similar flexible coupling, it may carry a screw engaging a nut as shown in Figure 2, or conveniently a worm cooperating with the quadrant. Again where the undercarriage according to the present invention is used on high speed aircraft, it may be found desirable to provide for retraction of the wheels for the purpose of reducing aerodynamic drag. The operating mechanism for controllably setting the wheels will in most cases be designed in conjunction with the retractable gear whereby unnecessary mechanism may be obviated; for example in an arrangement such as illustrated in Figure 2 the main wheels 14 could readily by suitable modification be retracted about the longitudinal axis of the rod 31, the nuts 28 rotating on the screw. It will of course be necessary to provide adequate means for bearing the loads of landing and take-off at the upper extremity of the wheel support, and for resisting the forces, e. g., endwise loads in the rod 32, which when the aircraft is ground borne may tend to change the alignment or the parallelism of the wheels.

What I claim is:

1. In an airplane, main landing wheels laterally spaced apart, a subsidiary landing wheel spaced longitudinally of the airplane from the main landing wheels, means operable in flight for directionally setting said main landing wheels, in parallel tracks, and pilot-operable means to steer the subsidiary landing wheel, without disturbance of the setting of the main landing wheels.

2. In an aircraft, main landing wheels laterally spaced apart, a subsidiary landing wheel spaced longitudinally of the aircraft from the main landing wheels, means operable whilst in flight for directionally setting said main landing wheels, in parallel tracks, at a desired angle to the longitudinal axis of the aircraft, means to secure the main landing wheels in such setting, and pilot-operable means to steer the subsidiary landing wheel, independently of and without disturbing the setting of the main landing wheels.

3. In an aircraft, main landing wheels laterally spaced apart and mounted for rotative movement each about an upright axis, a subsidiary landing wheel spaced longitudinally of the aircraft from the main landing wheels, and likewise mounted for rotative movement about an upright axis, means interconnecting all the landing wheels, and operable in flight for directionally setting all said landing wheels, in parallel tracks, at a desired angle to the longitudinal axis of the aircraft, and pilot-operable means to steer the subsidiary landing wheel, in any directionally set position, independently of and without disturbing the setting of the main landing wheels.

4. In an aircraft, main landing wheels laterally spaced apart and mounted for rotative movement each about an upright axis, means operable in flight for directionally setting said main landing wheels, in parallel tracks, into a desired angular position, relative to the aircraft's longitudinal axis, each about its own upright axis, a subsidiary landing wheel spaced longitudinally of the aircraft from the main landing wheels, means supporting said subsidiary landing wheel for castoring movement, about an upright axis, and pilot-operable means to rotate the supporting means about such upright axis, to steer the subsidiary landing wheel, independently of the castoring means and of the main landing wheels, and without disturbing the setting of the latter.

5. In an aircraft, main landing wheels laterally spaced apart and mounted for rotative movement each about an upright axis, means operable in flight for directionally setting said main landing wheels, in parallel tracks, into a desired angular position, relative to the aircraft's longitudinal axis, each about its own upright axis, a subsidiary landing wheel spaced longitudinally of the aircraft from the main landing wheels, means supporting said subsidiary landing wheel for movement about an upright axis, said supporting means including yieldable self-restoring castoring means for the subsidiary landing wheel, and pilot-operable means to rotate the supporting means about such upright axis, to steer the subsidiary landing wheel.

6. In an aircraft, main landing wheels laterally spaced apart and mounted for rotative movement each about an upright axis, a subsidiary landing wheel spaced longitudinally of the aircraft from the main landing wheels, a support wherein said subsidiary landing wheel is mounted for rotative movement about an upright axis, means operable in flight for directionally setting all said landing wheels, in parallel tracks, at a desired angle, each about its upright axis, and relative to the longitudinal axis of the aircraft, and means interengaged between the subsidiary landing wheel and its support for rotation of the subsidiary landing wheel, independently of and without disturbing the setting of the main landing wheels.

7. The combination of claim 6, including pilot-operable means to effect rotation of the subsidiary landing wheel, independently of the main landing wheels, for steering of the aircraft when ground-borne.

8. The combination of claim 6, including resilient means to restore the subsidiary landing wheel to parallelism with the main landing wheels, upon the cessation of a force which acts upon the subsidiary landing wheel to deflect it.

9. The combination of claim 6, including means to lock the main landing wheels, and the support for the subsidiary landing wheel, in various directionally set positions of adjustment, the subsidiary landing wheel being positioned by its support in each such set position, but being free to rotate about its upright axis, relative to its support, in any such set position.

10. The combination of claim 6, including means to lock the main landing wheels, and the support for the subsidiary landing wheel, in various directionally set positions of adjustment, the subsidiary landing wheel being positioned by its support in each such set position, but being free to rotate about its upright axis, relative to its support, in any such set position, and means operatively connected between the subsidiary wheel and its support, yieldable under the influence of an external force tending to deflect the subsidiary wheel from a given set position, and operable to restore such wheel to such position upon the removal of such deflecting force.

11. The combination of claim 6, wherein the upright axis of the subsidiary landing wheel is offset to one side of the horizontal axis of such wheel, to induce castor trailing.

12. In an aircraft, main landing wheels laterally spaced apart, a subsidiary landing wheel spaced longitudinally of the aircraft from the main landing wheels, means supporting said wheels for rotation of each about an upright axis, means so to rotate all said wheels into a desired set position, wherein all are parallel, means to lock each wheel, independently of all other wheels, in such set position, and means interposed between the subsidiary wheel and its lock for rotation of such wheel about its upright axis regardless of its lock, and without disturbing the setting of the main landing wheels.

13. In an aircraft, main landing wheels laterally spaced apart, a subsidiary landing wheel spaced longitudinally of the aircraft from the main landing wheels, means supporting said wheels for rotation of each about an upright axis, means so to rotate all said wheels into a desired set position, wherein all are parallel, means to lock each wheel, independently of all other wheels, in such set position, and means interposed between the subsidiary wheel and its lock for rotation of such wheel about its upright axis regardless of its lock, and without disturbing the setting of the main landing wheels, and means common to all said locks to actuate the same simultaneously.

14. In an aircraft, main landing wheels laterally spaced apart, a subsidiary landing wheel spaced longitudinally of the aircraft from the main landing wheels, means supporting said wheels for rotation of each about an upright axis, means so to rotate all said wheels into a desired set position, wherein all are parallel, reacting between each wheel and adjacent aircraft structure, means to lock each wheel, independently of all other wheels, in such set position, and means interposed between the subsidiary wheel and its lock for rotation of such wheel about its upright axis regardless of its lock, and without disturbing the setting of the main landing wheels.

15. In an aircraft, main landing wheels laterally spaced apart, a subsidiary landing wheel spaced longitudinally of the aircraft from the main landing wheels, means operable in flight for directionally setting the main landing wheels, in parallel tracks, at a desired angle to the longitudinal axis of the aircraft, means to set the subsidiary landing wheel in a position parallel to any set position of the main landing wheels, pilot-operable means to rotate the subsidiary landing wheel, from any set position, about an upright axis for steering, and mounting means for said subsidiary landing wheel incorporating means yieldable for rotation of such wheel about its upright axis, under the influence of an external deflecting force, and independently of its setting means or of its steering means.

16. The combination of claim 15, including also means to return the subsidiary landing wheel to its position as determined by its setting means and by its steering means, upon the removal of the external deflecting force.

17. The combination of claim 2, wherein the means to secure the main landing wheels in a set position includes hydraulic transmitter means and locking means therefor.

18. The combination of claim 12, the locking means comprising an hydraulic transmitter and a plurality of connected hydraulic slave units, one at each wheel, and means to lock parts of the hydraulic system in wheel-set positions.

19. In an aircraft, in combination, main landing wheels laterally spaced apart, a subsidiary landing wheel spaced longitudinally from the main landing wheels, means interconnecting all the wheels for conjoint rotation from normal fore-and-aft planes each into a directionally set position, in parallel tracks, at a desired angle to the longitudinal axis of the aircraft, a single pilot-operated means for thus setting the several wheels, and pilot-operable means to steer the subsidiary landing wheel, without disturbance of the setting of the main landing wheels.

20. In an aircraft, in combination, main landing wheels laterally spaced apart, pilot-operated means to rotate said wheels into a directionally set position, in parallel tracks, at a desired angle to the longitudinal axis of the aircraft, a subsidiary landing wheel spaced longitudinally from the main landing wheels, pilot-operable means to steer the subsidiary landing wheel, independently of the main landing wheels and of their setting means, and means operatively connecting the setting means to the subsidiary landing wheel, to rotate the latter into a like directionally-set position coincidentally with the setting of the main landing wheels, without disturbance of the steering means.

21. In an aircraft, in combination, main landing wheels laterally spaced apart, pilot-operated means to rotate said wheels into a directionally-set position, in parallel tracks, at a desired angle to the longitudinal axis of the aircraft, a subsidiary landing wheel spaced longitudinally from the main landing wheels, and supported for rotation about an upright axis, and two means operatively connected to the subsidiary landing wheel and cooperating to govern its rotation about such axis, one such means being interconnected to the means for rotating and setting the main landing wheels, for directional setting of the subsidiary landing wheel conjointly with the main landing wheels, and the other such means being pilot-operable, in any set position or during setting of the subsidiary landing wheel, to steer the latter without disturbance of the setting of the main landing wheels.

22. In an aircraft, in combination, main landing wheels laterally spaced apart, a subsidiary landing wheel spaced longitudinally from the main landing wheels, means interconnecting all the wheels for conjoint rotation about upright axes from normal fore-and-aft planes each into a directionally-set position, in parallel tracks, at a desired angle to the longitudinal axis of the aircraft, a single pilot-operated means for thus setting the several wheels, pilot-operated means to steer the subsidiary landing wheel, independently of and without disturbance of the setting of the main landing wheels, and local supporting means for the subsidiary landing wheel, including self-restoring castoring means.

OWEN FINLAY MACLAREN.